(12) United States Patent
Takahashi et al.

(10) Patent No.: US 10,183,346 B2
(45) Date of Patent: Jan. 22, 2019

(54) ROTARY MILLING TOOL

(71) Applicant: UNION TOOL CO., Tokyo (JP)

(72) Inventors: Shoichi Takahashi, Tokyo (JP); Nozomu Sato, Tokyo (JP)

(73) Assignee: UNION TOOL CO., Tokyo (JP)

( * ) Notice: Subject to any disclaimer, the term of this patent is extended or adjusted under 35 U.S.C. 154(b) by 609 days.

(21) Appl. No.: 14/748,875

(22) Filed: Jun. 24, 2015

(65) Prior Publication Data
US 2016/0001382 A1 Jan. 7, 2016

(30) Foreign Application Priority Data
Jul. 7, 2014 (JP) .................................. 2014-139600

(51) Int. Cl.
B23C 5/10 (2006.01)

(52) U.S. Cl.
CPC ........ B23C 5/10 (2013.01); *B23C 2210/0428* (2013.01); *B23C 2210/0457* (2013.01); *B23C 2210/082* (2013.01); *B23C 2210/086* (2013.01); *B23C 2210/28* (2013.01); *B23C 2210/285* (2013.01); *B23C 2210/287* (2013.01); *B23C 2210/325* (2013.01); *B23C 2210/54* (2013.01);
(Continued)

(58) Field of Classification Search
CPC ..... B23C 5/10; B23C 5/1009; B23C 2210/64; B23C 2210/486; B23C 2210/48; B23C 2210/54
See application file for complete search history.

(56) References Cited

U.S. PATENT DOCUMENTS 1,418,485 A 6/1922 Smith
5,160,232 A * 11/1992 Maier ..................... B23B 51/02
407/54
(Continued)

FOREIGN PATENT DOCUMENTS

DE 1177904 9/1964
DE 3700754 A1 7/1987
(Continued)

OTHER PUBLICATIONS

Communication dated Oct. 15, 2015 from the Japanese Patent Office in counterpart application No. 2014-139600.
(Continued)

*Primary Examiner* — Will Fridie, Jr.
(74) *Attorney, Agent, or Firm* — Sughrue Mion, PLLC

(57) ABSTRACT

Provided is a rotary milling tool capable of finishing a milled surface to produce a smooth and glossy surface. A rotary milling tool in which a plurality of chip discharge grooves (2) are provided to the outer periphery of a tip part of a tool body (1), the plurality of chip discharge grooves (2) extending from the tool tip toward the tool base, and bottom blades (5, 6) are provided to an intersection ridge part at the intersection of a rake surface (3) of the chip discharge grooves (2) and a tip flank surface (4) of the tool body (1), each of the bottom blades (5, 6) being formed integrally with the tool body (1), wherein a convex edge (7) that is convex toward a tool-axis-direction tip is formed on at least one of the bottom blades (5, 6), and the convex edge (7) is formed by the connection of a plurality of linear edges that are substantially linear.

19 Claims, 6 Drawing Sheets

(52) U.S. Cl.
CPC ...... *B23C 2220/28* (2013.01); *B23C 2222/84* (2013.01)

(56) References Cited

U.S. PATENT DOCUMENTS

| | | | | |
|---|---|---|---|---|
| 7,186,063 | B2* | 3/2007 | Volokh | B23C 5/10 407/53 |
| 8,047,747 | B2* | 11/2011 | Flynn | B23C 5/003 407/53 |
| 8,277,152 | B2* | 10/2012 | Azegami | B23C 5/10 407/53 |
| 9,050,666 | B2* | 6/2015 | Kuroda | B23C 5/10 |
| 9,144,845 | B1* | 9/2015 | Grzina | B23B 27/00 |
| 2003/0180104 | A1* | 9/2003 | Kuroda | B23C 5/10 407/54 |
| 2006/0060053 | A1* | 3/2006 | Tanaka | B23C 5/10 83/663 |
| 2009/0092452 | A1* | 4/2009 | Sato | B23B 51/02 407/54 |
| 2010/0098504 | A1 | 4/2010 | Giebler | |
| 2014/0341662 | A1* | 11/2014 | Yamayose | B23C 5/10 407/54 |
| 2015/0174672 | A1* | 6/2015 | Baba | B23C 5/10 407/54 |

FOREIGN PATENT DOCUMENTS

| | | |
|---|---|---|
| JP | 62-117013 U | 7/1987 |
| JP | 666910 U | 9/1994 |
| JP | 2557189 B2 | 12/1997 |
| JP | 2002-292515 A | 10/2002 |
| JP | 2005-52924 A | 3/2005 |
| JP | 2008-44040 A | 2/2008 |
| RU | 1282988 A1 | 1/1987 |
| TW | I375595 B | 11/2012 |

OTHER PUBLICATIONS

Communication dated Nov. 4, 2015 from the European Patent Office in counterpart application No. 15174832.4.
Communication dated Jan. 14, 2016 from the Japanese Patent Office in counterpart application No. 2014-139600.
Communication dated Oct. 5, 2017 from the Taiwanese Intellectual Property Office in counterpart Application No. 104119275.
Communication dated Mar. 13, 2017 from the State Intellectual Property Office of the P.R.C. in counterpart Application No. 201510390532.5.
Communication dated Aug. 9, 2017 from the Korean Intellectual Property Office in counterpart Application No. 10-2015-0095048.

* cited by examiner

ROTARY MILLING TOOL

TECHNICAL FIELD

The present invention relates to a rotary milling tool.

BACKGROUND ART

Among steel materials, carbon steels for machine construction are inexpensive, and therefore are frequently used in component milling and for mold bases.

When such carbon steels are milled using a typical square end mill that is capable of planar milling and side-surface milling, an example of the end mill being disclosed in patent document 1, a tip corner part which is a portion at which a bottom blade and an outer peripheral blade of a blade part are connected becomes damaged, whereby gouges and deep cuts are produced in a planar milled surface.

Additionally, work material adheres to the cutting blade of each of the blades, such that the same defects as described above are produced due to "built up edge" when the milling operation is performed. Specifically, overcutting of the milled surface due to the development of built up edge formed on the cutting blade, gouges in the milled surface due to built up edge dulling the cutting blade, damage to the milled surface and advanced damage to the tool due to meshing with built up edge that has broken off, and other such defects are produced.

Because all of the defects described above cause deep cuts to be left behind in the milled surface, it is highly labor-intensive to remove these deep cuts when the milled surface is polished. Additionally, the polishing treatment is often performed manually; depending on the technical skill, proficiency, and the like of a worker, the possibility of degradation in milling dimension accuracy may increase. Therefore, it is difficult to obtain a smooth and glossy surface.

In order to overcome such problems, typically, the temperature near the milling point is raised by using an oil-based cutting fluid in an extreme-pressure additive, raising the milling speed, or increasing the amount of incisions, whereby the work material is softened, minimizing damage to the tip corner part of the tool as well as the occurrence of built up edge.

However, it is typically impossible to avoid initiating milling from a normal-temperature state, and when air cutting is incorporated into a milling program, the tool and the work material may be cooled; therefore, in reality, the problems described above are not overcome by the technique described above.

PRIOR-ART DOCUMENTS

[Patent Document 1] Registered Utility Model No. 2557189

DISCLOSURE OF THE INVENTION

In order to solve the aforementioned problems, the present invention provides a rotary milling tool capable of getting rid of the effects of gouges and the like in a planar milled surface that accompany damage to a tip corner part of the tool, and furthermore capable of minimizing the formation of built up edge and finishing the milled surface to produce a smooth and glossy surface.

The main points of the present invention are described below with reference to the attached drawings.

The present invention relates to a rotary milling tool in which a plurality of chip discharge grooves 2 are provided to the outer periphery of a tip part of a tool body 1, the plurality of chip discharge grooves 2 extending from the tool tip toward the tool base, and bottom blades 5, 6 are provided to an intersection ridge part at the intersection of a rake surface 3 of the chip discharge grooves 2 and a tip flank surface 4 of the tool body 1, each of the bottom blades 5, 6 being formed integrally with the tool body 1, wherein the rotary milling tool is characterized in that a convex edge 7 that is convex toward a tool-axis-direction tip is formed on at least one of the bottom blades 5, 6, and the convex edge 7 is formed by the connection of a plurality of linear edges that are substantially linear.

The present invention also relates to a rotary milling tool according to the first aspect, wherein the rotary milling tool is characterized in that the convex edge 7 is obtusely formed by the connection of at least a linear edge 8 gradually inclined upward toward the tool tip, the linear edge 8 extending from the outer periphery of the tool toward the center of the tool, and a linear edge 9 gradually inclined downward toward the tool base, the linear edge 9 extending from the outer periphery of the tool toward the center of the tool.

The present invention also relates to a rotary milling tool according to the first aspect, wherein the rotary milling tool is characterized in that the concavity angle $\alpha$ of the bottom blades 5, 6 having the convex edge 7 is equal to or greater than $-5°$ and less than $0°$, the length M of the concave part of the bottom blades 5, 6 having the convex edge 7 is equal to or greater than 0.002 mm and equal to or less than one-fourth the outer diameter of the tool, and the rake angle $\beta$ of the bottom blades 5, 6 having the convex edge 7 is equal to or greater than $5°$ and equal to or less than $30°$.

The present invention also relates to a rotary milling tool according to the second aspect, wherein the rotary milling tool is characterized in that the concavity angle $\alpha$ of the bottom blades 5, 6 having the convex edge 7 is equal to or greater than $-5°$ and less than $0°$, the length M of the concave part of the bottom blades 5, 6 having the convex edge 7 is equal to or greater than 0.002 mm and equal to or less than one-fourth the outer diameter of the tool, and the rake angle $\beta$ of the bottom blades 5, 6 having the convex edge 7 is equal to or greater than $5°$ and equal to or less than $30°$.

The present invention also relates to a rotary milling tool according to the third aspect, wherein the rotary milling tool is characterized in that the rake surface 3 of the bottom blades 5, 6 having the convex edge 7 is formed to be substantially planar, and the concave part has a centrally raised configuration.

The present invention also relates to a rotary milling tool according to the fourth aspect, wherein the rotary milling tool is characterized in that the rake surface 3 of the bottom blades 5, 6 having the convex edge 7 is formed to be substantially planar, and the concave part has a centrally raised configuration.

The present invention also relates to a rotary milling tool according to the fifth aspect, wherein the rotary milling tool is characterized in being provided with a plurality of blade parts comprising the bottom blades 5, 6 having the convex edge 7.

The present invention also relates to a rotary milling tool according to the sixth aspect, wherein the rotary milling tool is characterized in being provided with a plurality of blade parts comprising the bottom blades 5, 6 having the convex edge 7.

The present invention also relates to a rotary milling tool according to the seventh aspect, wherein the rotary milling tool is characterized in being provided with a plurality of blade parts in which outer peripheral blades 10, 11 are connected to the bottom blades 5, 6, at least one of the bottom blades 5 of these blade parts being a primary bottom blade 5 acting when planar milling is performed, and at least one of the bottom blades 6 of these blade parts being a secondary bottom blade 6 provided so as to recede toward the tool base with respect to the primary bottom blade 5.

The present invention also relates to a rotary milling tool according to the eighth aspect, wherein the rotary milling tool is characterized in being provided with a plurality of blade parts in which outer peripheral blades 10, 11 are connected to the bottom blades 5, 6, at least one of the bottom blades 5 of these blade parts being a primary bottom blade 5 acting when planar milling is performed, and at least one of the bottom blades 6 of these blade parts being a secondary bottom blade 6 provided so as to recede toward the tool base with respect to the primary bottom blade 5.

The present invention also relates to a rotary milling tool according to the ninth aspect, wherein the rotary milling tool is characterized in that the outer peripheral rake angle of the outer peripheral blade 11 connected to the secondary bottom blade 6 is equal to or greater than 5° and equal to or less than 30°.

The present invention also relates to a rotary milling tool according to the tenth aspect, wherein the rotary milling tool is characterized in that the outer peripheral rake angle of the outer peripheral blade 11 connected to the secondary bottom blade 6 is equal to or greater than 5° and equal to or less than 30°.

The present invention also relates to a rotary milling tool according to the eleventh aspect, wherein the rotary milling tool is characterized in that the same number of blade parts comprising the primary bottom blades 5 and blade parts comprising the secondary bottom blades 6 are provided in an alternating manner.

The present invention also relates to a rotary milling tool according to the twelfth aspect, wherein the rotary milling tool is characterized in that the same number of blade parts comprising the primary bottom blades 5 and blade parts comprising the secondary bottom blades 6 are provided in an alternating manner.

The present invention also relates to a rotary milling tool according to the thirteenth aspect, wherein the rotary milling tool is characterized in that, in a region in which the outer peripheral blade 11 of the blade part comprising the secondary bottom blade 6 performs a milling operation, the outer peripheral blade 10 of the blade part comprising the primary bottom blade 5 is set back inward in the radial direction of the tool with respect to the outer peripheral blade 11 connected to the secondary bottom blade 6.

The present invention also relates to a rotary milling tool according to the fourteenth aspect, wherein the rotary milling tool is characterized in that, in a region in which the outer peripheral blade 11 of the blade part comprising the secondary bottom blade 6 performs a milling operation, the outer peripheral blade 10 of the blade part comprising the primary bottom blade 5 is set back inward in the radial direction of the tool with respect to the outer peripheral blade 11 connected to the secondary bottom blade 6.

The present invention also relates to a rotary milling tool according to the fifteenth aspect, wherein the rotary milling tool is characterized in that at least one of the chip discharge grooves 2 among the plurality of chip discharge grooves 2 is formed in a helical shape around the tool central axis.

The present invention also relates to a rotary milling tool according to the sixteenth aspect, wherein the rotary milling tool is characterized in that at least one of the chip discharge grooves 2 among the plurality of chip discharge grooves 2 is formed in a helical shape around the tool central axis.

The present invention also relates to a rotary milling tool according to the seventeenth aspect, wherein the rotary milling tool is characterized in being a square end mill.

The present invention also relates to a rotary milling tool according to the eighteenth aspect, wherein the rotary milling tool is characterized in being a square end mill.

Because the present invention is configured as described above, a rotary milling tool is obtained which is capable of finishing a milled surface to produce a smooth and glossy surface.

BEST MODE FOR CARRYING OUT THE INVENTION

Figure 1:
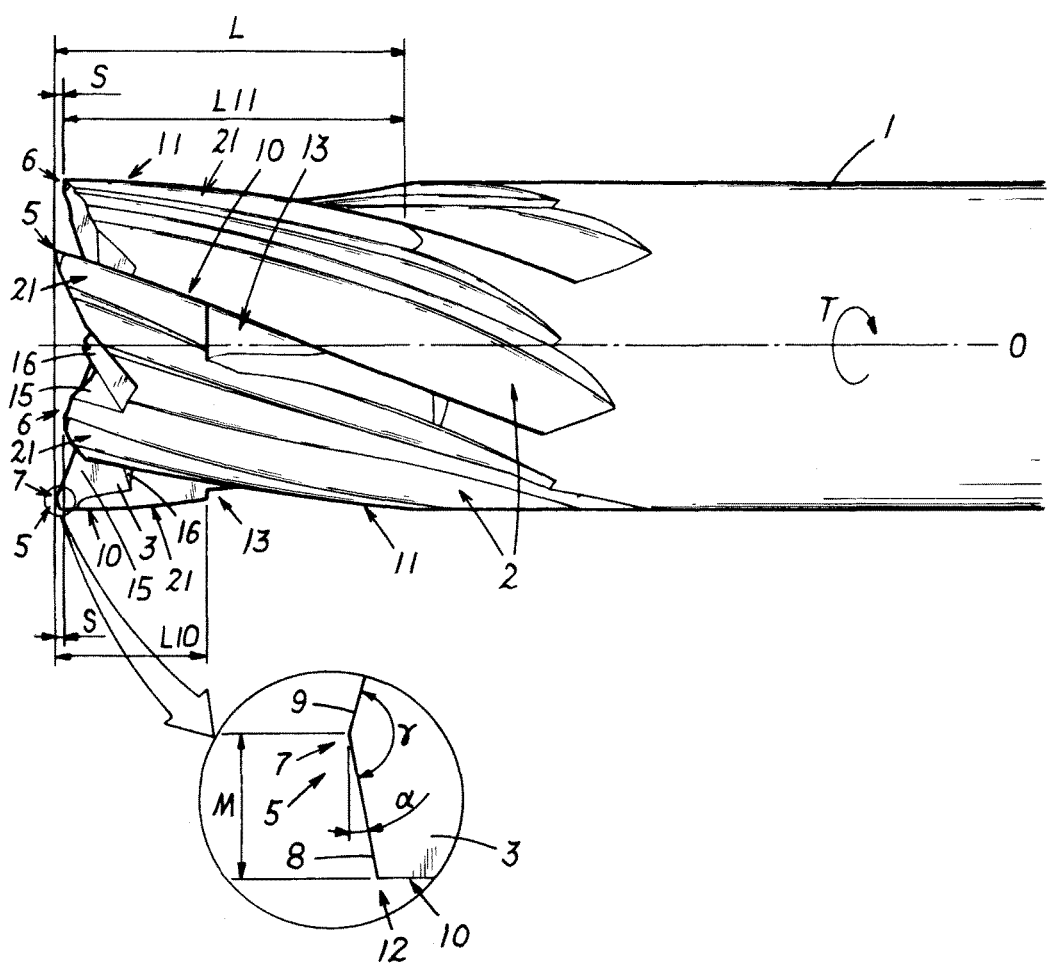
FIG. 1 is a schematic side view of the present embodiment.

Preferred embodiments of the present invention are briefly described below with reference to the drawings while indicating the operation of the present invention.

A convex edge 7 is present on a bottom blade 5, whereby the convex edge 7 portion is the main portion that accomplishes a milling operation during planar milling (the main portion that comes in contact with the planar milled surface), and even if a tip corner part of the tool is damaged, gouges and the like that would be caused by contact with the damaged tip corner part are not readily produced in the planar milled surface.

Specifically, although damage is produced from a sharper tip corner part even when a convex edge 7 is provided, it is mainly the convex edge 7 that comes in contact with the planar milled surface; therefore, contact with a damaged tip corner part is minimized as much as possible. Additionally, even if a gouge or the like is produced in the planar milled surface due to coming in contact with a damaged tip corner part, milling can progress while the cutting marks produced by the tip corner part are removed by the cutting performed during planar milling by the convex edge 7 that protrudes further toward the planar milled surface.

Therefore, gouges and the like by a damaged tip corner part are not readily produced in the planar milled surface, and even when gouges and the like are produced, these gouges can be removed by the convex edge 7, enabling a high-quality planar milled surface to be easily obtained. Additionally, it is possible to overcome the effects of a damaged tip corner part, and it is therefore possible to extend a cutting distance such that a desired level of quality in the milled surface is ensured, consequently enabling the service life of the tool to be extended.

Furthermore, the convex edge 7 can be formed by the connection of linear edges, enabling a tool to be easily manufactured while variations in form are minimized in tool production, without implementing the formation of an "R"-shaped part on the tip corner part of the tool or another such complicated milling step as with, e.g., a radius end mill.

Furthermore, setting the bottom blades 5, 6 having the convex edge 7 to have a prescribed rake angle makes it possible to adopt a configuration in which it is possible to minimize the formation of built up edge as much as possible, enabling gouges and the like in a milled surface due to built up edge to be minimized.

Examples

Specific examples of the present invention are described below with reference to the drawings.

The present embodiment relates to a rotary milling tool in which a plurality of helical chip discharge grooves 2 are provided to the outer periphery of a tip part of a tool body 1, the plurality of chip discharge grooves 2 extending from the tool tip toward the tool base, and bottom blades 5, 6 are provided to an intersection ridge part at the intersection of a rake surface 3 of the chip discharge grooves 2 and a tip flank surface 4 of the tool body 1, each of the bottom blades 5, 6 being formed integrally with the tool body 1, wherein a convex edge 7 that is convex toward a tool-axis-direction tip is formed on at least one of the bottom blades 5, 6, and the convex edge 7 is formed by the connection of a plurality of linear edges that are substantially linear.

The present embodiment also relates to a rotary milling tool in which outer peripheral blades 10, 11 are provided to an intersection ridge part at the intersection of the chip discharge grooves 2 and the outer peripheral surface 21 of the tool body 1, each of the outer peripheral blades 10, 11 being formed integrally with the tool body 1. In the present embodiment, the outer peripheral surface 21 is set as an outer peripheral flank surface gradually inclined toward the center of the tool, the outer peripheral flank surface extending rearward along the tool rotation direction from the outer peripheral blades 10, 11. The outer peripheral flank surface may be a planar surface inclined linearly, or may be a curved surface inclined in a rounded manner. In the present embodiment, the outer peripheral surface 21 is set as an outer peripheral flank surface which is a curved surface gradually inclined in a rounded manner toward the center of the tool, the outer peripheral flank surface extending rearward along the tool rotation direction from the outer peripheral blades 10, 11.

Specifically, the present embodiment relates to a square end mill having a plurality of blade parts such that the outer peripheral blades 10, 11 are connected to the bottom blades 5, 6, which are provided integrally to the tool body 1, with a tip corner part 12 interposed therebetween, the square end mill being used to mill a planar surface, mill a side surface, mill a pocket, and perform other such milling on carbon steels or the like.

In the present embodiment, at least one bottom blade 5 among the bottom blades 5, 6 is a primary bottom blade 5 having the convex edge 7 and acting when planar milling is performed, and the other bottom blade 6 is a secondary bottom blade 6 provided so as to recede toward the tool base with respect to the primary bottom blade 5. Specifically, the secondary bottom blade 6 is configured so as to be sunken and set back toward the tool base with respect to the primary bottom blade 5 having the convex edge 7, and is configured so as to substantially avoid performing the milling operation on the planar surface. Specifically, the bottom blades 5, 6 are configured such that the rotational trajectory of the tip edge of the secondary bottom blade 6 about a tool axis (tool center axis) O is sunken with respect to the rotational trajectory of the tip edge (cutting blade) of the primary bottom blade 5, and recedes toward the tool base.

In the present embodiment, the outer peripheral rake angle of the outer peripheral blade 11 connected to the secondary bottom blade 6 which recedes toward the tool base is set equal to or greater than 5° and equal to or less than 30° so that the milled side surface becomes a smooth and glossy milled surface. An outer peripheral rake angle of less than 5° worsens milling properties and causes built up edge to more readily form; conversely, an outer peripheral rake angle exceeding 30° makes the blade angle too small, worsens durability against cutting resistance, and causes defects to more readily occur.

In a region in which the outer peripheral blade 11 of the blade part comprising the secondary bottom blade 6 performs a milling operation, the secondary bottom blade 6 receding a prescribed length toward the tool base from the primary bottom blade 5, the outer peripheral blade 10 of the blade part comprising the primary bottom blade 5 having the convex edge 7 is configured so as to be set back inward in the radial direction of the tool (toward the center of the tool) with respect to the outer peripheral blade 11 connected to the secondary bottom blade 6 which recedes toward the tool base, and so as to avoid performing the milling operation on the side surface.

The present embodiment will be specifically described on the basis of FIG. 1. The outer peripheral blade 10 of the blade part comprising the primary bottom blade 5 having the convex edge 7 is provided in a region of length L10 extending from the tool tip toward the tool base; the outer peripheral blade 11 is provided in a region of length L11 extending from a position receded by length S toward the tool base from the primary bottom blade 5, specifically, from a tip position on the secondary bottom blade 6, toward the tool base. The length L10 along the tool axis direction is set equal to or less than the combined length of the S and the L11 (length L). In the present embodiment, as illustrated in FIG. 1, the length L10 of the blade part comprising the primary bottom blade 5 having the convex edge 7 is set shorter than the combined length L of the S and the L11.

The outer peripheral blade 11 has the same outer diameter from the tool tip toward the tool base (excluding a minute flat land part provided to the tool tip part). Specifically, the outer peripheral blade 11 is formed such that the rotational trajectory of the outer peripheral blade 11 when rotated about the tool axis O (tool center axis O) constitutes a columnar shape having the same outer diameter from the tool tip toward the tool base. In FIG. 1, T indicates the tool rotation direction (direction of rotation), the same as in FIGS. 2, 5, 7, and 8. The outer peripheral blade 10 is formed in a back taper shape having an outer diameter that is gradually reduced from the tool tip toward the tool base. Specifically, the outer peripheral blade 10 is formed such that the rotational trajectory of the outer peripheral blade 10 when rotated about the tool axis O (tool center axis O) forms a back taper shape having an outer diameter that is gradually reduced from the tool tip toward the tool base.

The tool tip parts of each of the outer peripheral blade 10 and the outer peripheral blade 11 have outer diameters set substantially the same. Therefore, the outer peripheral blade 10 is set back inward in the radial direction of the tool (toward the center of the tool) with respect to the outer peripheral blade 11. A flank concave part 13 set back further inward in the radial direction of the tool (toward the center of the tool) than is the outer peripheral blade 10 is provided closer to the tool base than is the end (one end on the tool base side) of the outer peripheral blade 10, whereby the outer peripheral blade 10 is configured to avoid performing the milling operation.

In the present embodiment, the outer peripheral blade 11 has the same outer diameter from the tool tip toward the tool base; however, the outer peripheral blade 10 may be set back inward in the radial direction of the tool (toward the center of the tool) with respect to the outer peripheral blade 11, and the outer peripheral blade 11 may be formed, extending from the tool tip toward the tool base, in a back taper shape having an outer diameter that is gradually reduced at a smaller degree of reduction than the degree of reduction of the outer peripheral blade 10.

Therefore, in the present embodiment, the blade part comprising the primary bottom blade 5 having the convex edge 7 performs planar milling using the primary bottom blade 5 (outside of the region S in which the secondary bottom blade 6 recedes toward the tool base with respect to the primary bottom blade 5, the outer peripheral blade 10 is set back inward in the radial direction of the tool (toward the center of the tool) with respect to the outer peripheral blade 11; therefore, except for a part on the tip side, the outer peripheral blade 10 does not contribute to side-surface milling), and the blade part comprising the secondary bottom blade 6 receding toward the tool base performs side-surface milling using the outer peripheral blade 11 (the secondary bottom blade 6 mostly does not contribute to planar milling). Thus, a configuration is adopted in which the bottom blade (primary bottom blade 5) for performing planar milling and the outer peripheral blade (outer peripheral blade 11) for performing side-surface milling are not connected and operate independently in different phases of tool rotation, whereby cutting resistance received by each of the blade part having the bottom blade and the blade part having the outer peripheral blade during milling does not directly act on the other blade part, excellent milling can be performed due to the dispersion of cutting resistance and discharged chips, and smooth and glossy high-quality planar milled surfaces and side-surface milled surfaces can be obtained.

Figure 2:
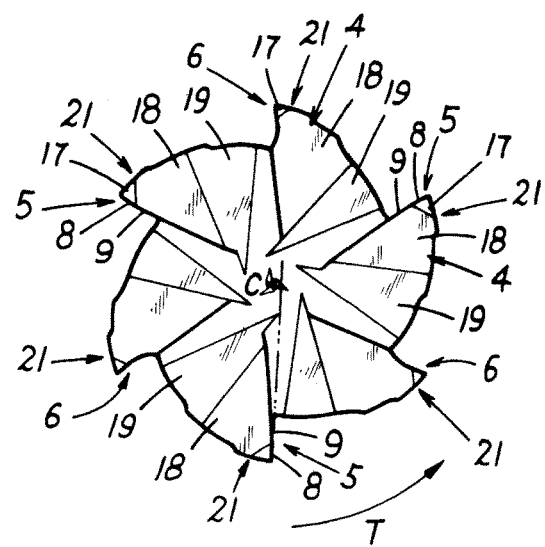
FIG. 2 is a schematic front view of the present embodiment.

The present embodiment is provided with a plurality of blade parts comprising the primary bottom blade 5 having the convex edge 7. Specifically, as shown in FIGS. 1 and 2, the same number (three of each) of blade parts comprising the secondary bottom blade 6 receding toward the tool base with respect to the primary bottom blade 5 and blade parts comprising the primary bottom blade 5 having the convex edge 7 are provided in an alternating manner at equally spaced intervals along the circumferential direction of the tool. Therefore, six chip discharge grooves 2 are provided.

The convex edge 7 will now be described in detail.

The convex edge 7 is formed by the connection of a plurality of linear edges that are substantially linear.

Specifically, a configuration is adopted in which the tip flank surface 4 provided to the tip of the tool body 1 is configured by the connection of a plurality of planar surfaces, and each of the intersection ridges at the intersection of each of these planar surfaces and the rake surface 3 of the chip discharge groove 2 constitutes a linear edge. At least one planar surface among the plurality of planar surfaces is an outer inclined planar surface which is inclined downward toward the outer periphery of the tool (outward), and at least one planar surface among the plurality of planar surfaces is an inner inclined planar surface which is inclined downward toward the center of the tool (inward); the outer inclined planar surface and the inner inclined planar surface are configured to be connected at an obtuse angle which is convex toward the tool-axis-direction tip, and each of the outer inclined planar surface and the inner inclined planar surface intersects the rake surface 3, the intersection ridges thereof forming linear edges that are substantially linear and constituting the obtuse convex edge 7 that is convex toward the tool-axis-direction tip.

For one primary bottom blade 5, there may be one of each of the outer inclined planar surface and the inner inclined planar surface which constitute the tip flank surface 4, or each of the outer inclined planar surface and the inner inclined planar surface may be provided by the connection of a plurality of inclined planar surfaces having different angles of inclination. Specifically, when each of the outer inclined planar surface and the inner inclined planar surface are provided by the connection of a plurality of inclined planar surfaces having different angles of inclination, the convex edge 7 is configured by the connection of linear edges having different angles of inclination.

In the present embodiment, a configuration is adopted in which one of each of the outer inclined planar surface and the inner inclined planar surface is provided. Specifically, the tip flank surface 4 intersecting with the rake surface 3 of the primary bottom blade 5 is configured such that an outer inclined planar surface 17 which is inclined downward toward the outer periphery of the tool (outward) and an inner inclined planar surface 18 which is inclined downward toward the center of the tool (inward) are connected at an obtuse angle which is convex toward the tool-axis-direction tip, and is designed so that the convex edge 7 appears at an intersection ridge at the intersection of the rake surface 3 of the primary bottom blade 5 and the tip flank surface 4. Reference symbol 19 in the drawings indicates a further flank surface connected to the tip flank surface 4.

Therefore, the convex edge 7 in the present embodiment is obtusely formed, so as to be convex toward the tool-axis-direction tip, by the connection of a linear edge 8 gradually inclined upward toward the tool tip, the linear edge 8 extending from the outer periphery of the tool toward the center of the tool and serving as the intersection ridge at the intersection of the rake surface 3 and the outer inclined planar surface 17, and a linear edge 9 gradually inclined downward toward the tool base, the linear edge 9 extending from the outer periphery of the tool toward the center of the tool and serving as the intersection ridge at the intersection of the rake surface 3 and the inner inclined planar surface 18. The convex edge 7 may be provided to only the primary bottom blade 5; however, in the present embodiment, a convex edge is also provided in the same manner to the secondary bottom blade 6 receding toward the tool base with respect to the primary bottom blade 5. Convex edges 7 of the same form are provided to the primary bottom blade 5 and the secondary bottom blade 6, the only difference being the position along the tool axis direction, whereby the simplicity of manufacturing the tool is increased.

As shown in FIG. 1, the connection angle $\gamma$ between the linear edge 8 and the linear edge 9 which constitute the convex edge 7 is obtuse; assuming that the connection angle $\gamma$ is approximately 145-175°, a configuration is achieved where the angle formed by the cutting blade of the convex edge 7 is increased relative to the tip corner part 12, and damage is substantially less likely to occur than with the tip corner part 12, making it possible to delay the progression of damage to a greater extent than with the tip corner part 12.

In the present embodiment, the concavity angle α is formed by a virtual line extending in a direction perpendicular to the tool axis and the linear edge 8 gradually inclined upward toward the tool tip, the linear edge 8 extending from the outer periphery of the tool toward the center of the tool, and is set to a prescribed angle as described below.

As shown in FIG. 1, the connection angle γ and the concavity angle α are angles in a plane that includes the linear edges and is oriented in a direction perpendicular to the tool axis. In the present embodiment, the concavity angle α is represented by a negative numerical value with an increase in the degree (angle) to which the linear edge 8 is inclined upward toward the tool tip. Specifically, when the linear edge 8 is parallel to the direction perpendicular to the tool axis, the concavity angle α is 0°; otherwise, the concavity angle α has a negative numerical value.

Figure 10:
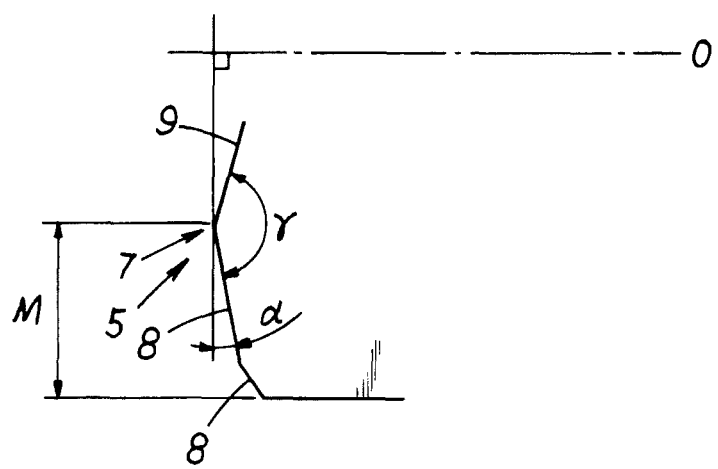
FIG. 10 is an enlarged side view of a concave part illustrating a schematic of alternative example 4.

The region from the tip corner part 12 of the primary bottom blade 5 to the convex part (the connection point between the linear edge 8 inclined upward toward the tool tip, the linear edge 8 extending from the outer periphery of the tool toward the center of the tool, and the linear edge 9 gradually inclined downward toward the tool base, the linear edge 9 extending from the outer periphery of the tool toward the center of the tool) of the convex edge 7 is defined as the concave part, and the length thereof along the direction perpendicular to the tool axis is set as length M of the concave part. As described above, a plurality of linear edges inclined upward toward the tool tip and having different angles of inclination may be connected within the concave part region. FIG. 10 shows an alternative example 4 in which two linear edges inclined upward toward the tool tip and having different angles of inclination are connected. Thus, because the convex edge 7 is formed by the connection of linear edges, it is easy to manage the shapes of the ridges, rake surface, and flank surface.

The rake surface 3 of the primary bottom blade 5 having the convex edge 7 is formed to be substantially planar, the convex edge 7 acting when planar milling is performed is provided at a position toward the outer circumference of the primary bottom blade 5, and at least the concave part of the primary bottom blade 5 has a centrally raised configuration.

Figure 7:
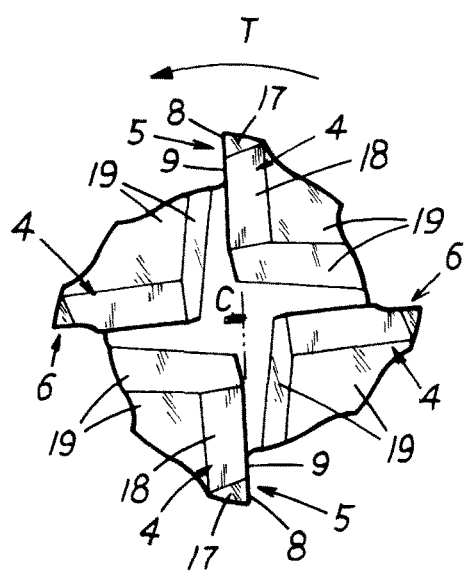
FIG. 7 is a schematic front view of alternative example 1.
Figure 8:
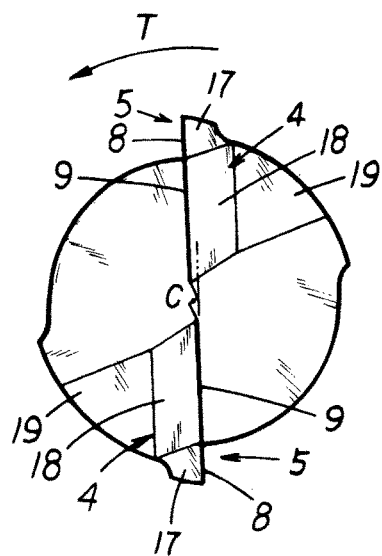
FIG. 8 is a schematic front view of alternative example 2.

The "centrally raised configuration" refers to a configuration in which, as viewed from the tool tip, the tool center C (a point on the tool axis O) is positioned rearward along the tool rotation direction with respect to an extended virtual line in which the linear edge 8 (concave part) of the primary bottom blade 5 is extended toward the center of the tool, as shown in FIGS. 2, 7, and 8. Conversely, a shape in which the tool center C (a point on the tool axis O) is positioned forward along the tool rotation direction with respect to the extended virtual line is referred to as a "centrally lowered configuration." The concave part of the primary bottom blade 5 has a centrally raised configuration in order to prevent circular cuts from being produced near the center when a groove is being milled, and in order to prevent accumulation of and meshing with chips that would cause such cuts during planar milling.

When the concave part of the primary bottom blade 5 has a centrally lowered configuration, it is impossible to guide chips along the rake surface direction of the primary bottom blade 5 at a point in time when the primary bottom blade 5 is parallel to the tool progression direction during planar milling of a groove, and the chips more readily accumulate in cuts. Additionally, the chips mesh with the primary bottom blade 5 due to subsequent rotation of the tool and progression of the tool along a feed direction, consequently allowing circular cuts P (see FIG. 5) to be readily produced near the center of a milled groove in a planar milled surface. Shaping the primary bottom blade 5 to have a centrally raised configuration makes it possible to overcome the disadvantages of a centrally lowered configuration, and to minimize the occurrence of circular cuts which are readily produced near the center of a milled groove.

In the present embodiment, a planar gash surface 15 is provided to the rake surface 3 (a wall surface facing forward in the tool rotation direction) of the chip discharge groove 2, and the rake surface 3 of the chip discharge groove 2 including the gash surface 15 serves as the rake surface 3 of the primary bottom blade 5. The primary bottom blade 5 is provided at an intersection ridge part at the intersection of the rake surface 3 of the primary bottom blade 5 and the tip flank surface 4. Reference symbol 16 in the drawings indicates a gash bottom surface connected to the gash surface 15.

The concave part of the primary bottom blade 5 will now be described in detail.

The length M of the concave part may be set greater than the feed per blade; in the present embodiment, the length M is set equal to or greater than 0.002 mm and equal to or less than one-fourth the outer diameter of the tool. Specifically, [the length M] can be set to, e.g., 0.2 mm when the tool has an outer diameter of 3 mm, 0.5 mm when the tool has an outer diameter of 10 mm, etc. Thus, the length M of the concave part is set longer than the feed per blade, whereby further milling of a planar surface can continue while a portion (a planar milled surface in which a gouge or the like has been produced) cut by a damaged tip corner part is removed by the convex edge 7, enabling a high-quality planar milled surface to be easily obtained.

The concavity angle α of the primary bottom blade 5 having the convex edge 7 is set equal to or greater than −5° and less than 0°. In consideration of the tilt of the tool due to cutting resistance, it is always desirable for the concavity angle α of the primary bottom blade 5 to be set so as to be negative. It is undesirable for the concavity angle α of the primary bottom blade 5 to be less than −5°, because this makes it impossible for the connection angle γ described above to be set sufficiently large (obtuse) and causes the convex edge 7 to be readily damaged; a concavity angle α of less than −5° may also degrade the flatness of the workpiece during planar milling. Therefore, it is preferable for the concavity angle α to be set equal to or greater than −3° and less than 0°.

Figure 3:
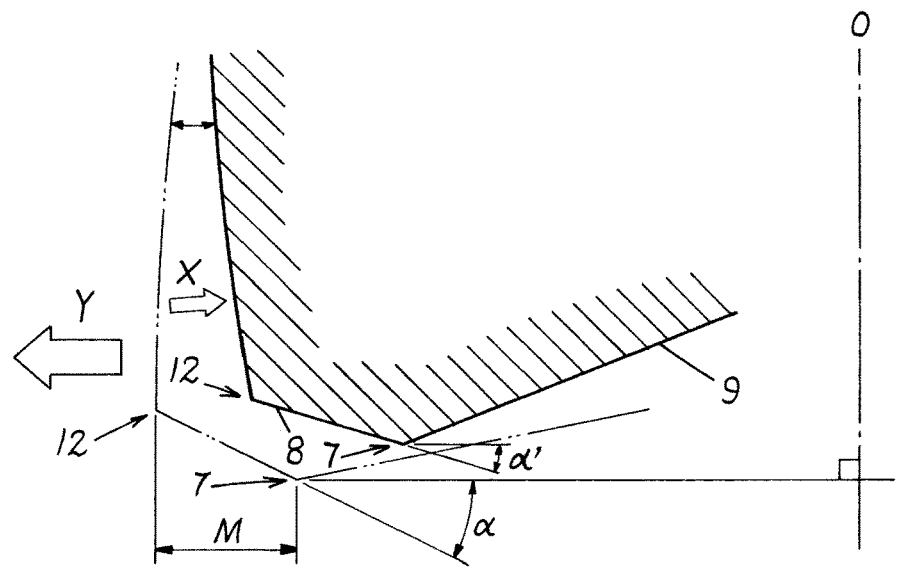
FIG. 3 is a schematic view illustrating a change in operating angle that accompanies tilting of the present embodiment.
Figure 5:
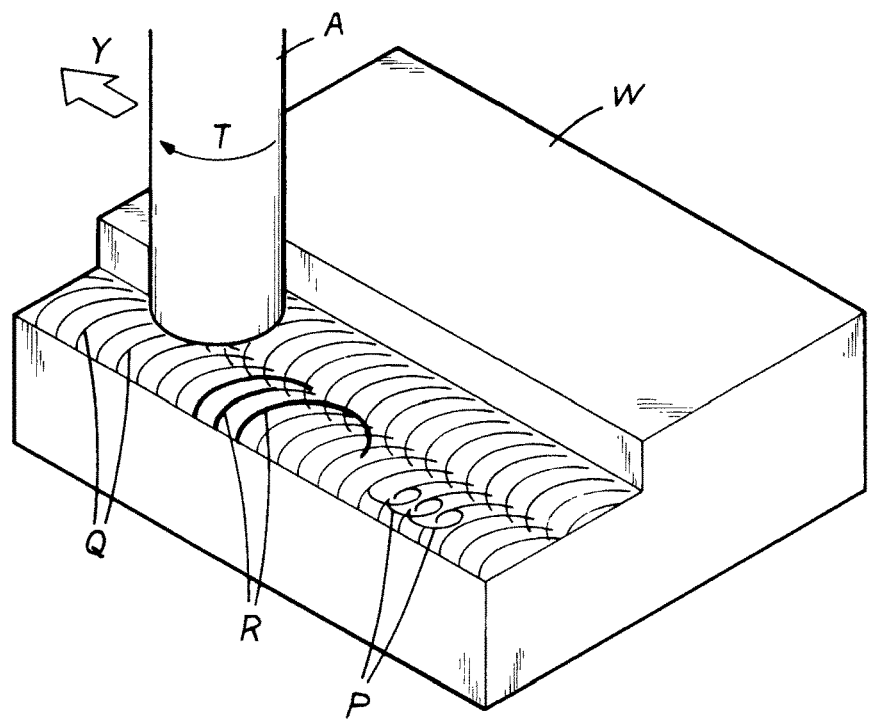
FIG. 5 is a schematic view illustrating a cut or the like produced during planar milling using a conventional tool.

Specifically, FIG. 3 shows a state in which a tool A is tilted due to cutting resistance received from a cut material (workpiece W) when a workpiece W as shown in FIG. 5 is milled. Specifically, when a tool that is fed in a Y direction receives cutting resistance, the tool is tilted in an X direction with respect to the feed direction Y.

In the concave part of the primary bottom blade 5 of the present embodiment, the linear edge 8 gradually inclined upward toward the tool tip, the linear edge 8 extending from the outer periphery of the tool toward the center of the tool, is formed at the concavity angle α with respect to the direction perpendicular to the tool axis; therefore, the linear edge 8 acts on the workpiece planar surface at an angle α (operating angle α) which is the same as the concavity angle α. However, in practical terms, the angle α' at which the linear edge 8 acts on the workpiece planar surface varies to be more positive than α due to tilting caused by the cutting resistance, becoming operating angle α'.

Specifically, even if the operating angle varies in the positive direction, e.g., to an operating angle α' of −3° due to tilting of a tool having a concavity angle (operating angle) α of −5°, the convex edge 7 is maintained in a state of acting on the planar milled surface; therefore, further milling of a planar surface can continue while a portion (a planar milled surface in which a gouge or the like has been produced) cut by a damaged tip corner part is removed by the convex edge 7, enabling a high-quality planar milled surface to be easily obtained.

Figure 4:
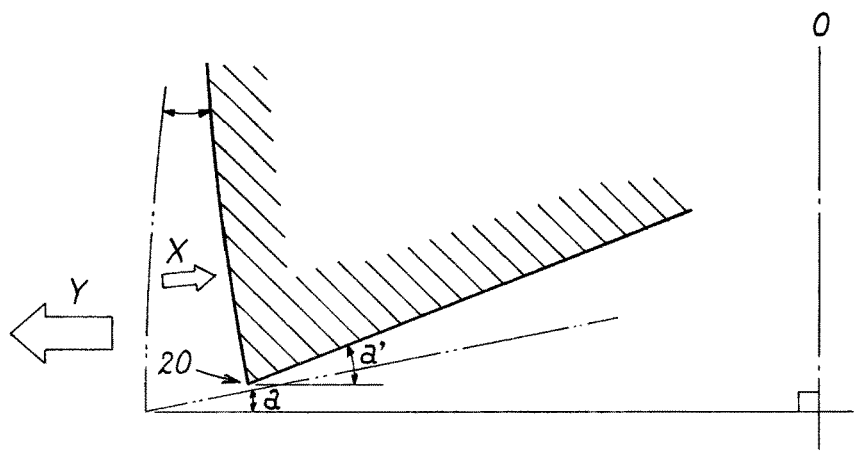
FIG. 4 is a schematic view illustrating a change in operating angle that accompanies tilting of a conventional tool.

When an end mill having a conventional bottom blade as shown in FIG. 4 is used, the concavity angle (operation angle) a, which was already positive, varies further in the positive direction to a' due to tilting of the end mill. Therefore, when a tip corner part 20 is damaged, the problems described above occur.

Thus, because the concavity angle (operation angle) a of a tool acting on a workpiece varies due to the amount of tilt of the tool; i.e., the amount of tilt of the tool varies due to the type of material being milled, the depth of the axial incision into the milled material, the depth of the radial incision, the feed rate, the feed per blade, the rotational speed, and other such milling conditions, the concavity angle α of the primary bottom blade 5 is set in consideration of these factors.

In order to cause the primary bottom blade 5 performing the milling operation on the substantially planar surface to be substantially linear, the rake surface 3 of the primary bottom blade 5 in the present embodiment is set to be substantially planar, as described above. When the rake surface 3 of the primary bottom blade 5 is curved into a concave shape rearward in the tool rotation direction as viewed from the tool tip, as shown by the secondary bottom blade 6 in FIG. 2, the primary bottom blade 5 has a centrally lowered configuration, and the advantage of the primary bottom blade 5, pertaining to the prevention of circular cuts near the groove center, is lost. Conversely, when the rake surface 3 of the primary bottom blade 5 is curved into a convex shape forward in the tool rotation direction as viewed from the tool tip, the formation of the milling region of the bottom blade into a "centrally raised configuration" is desirable, but the increase in difficulty of manufacture is undesirable. Therefore, setting the rake surface 3 of the primary bottom blade 5 to be substantially planar produces a configuration where not only can the primary bottom blade 5 be made substantially planar, but the chips can be guided away as desired and production can be facilitated.

Figure 6:
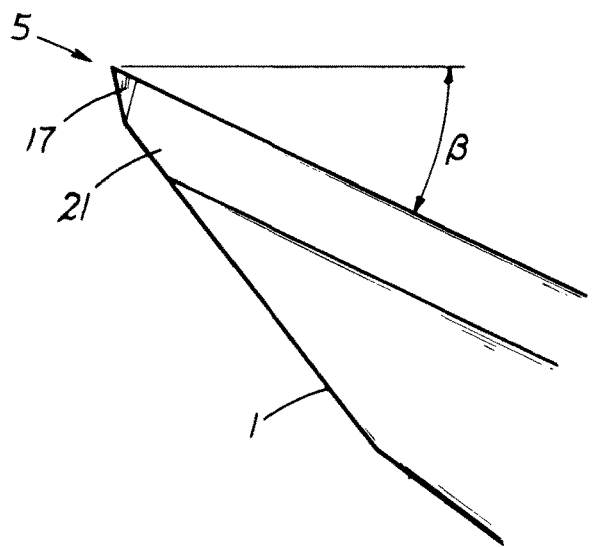
FIG. 6 is a schematic view illustrating the rake angle of a bottom blade.

When a conventional tool is used, built up edge is formed such that milled material is bonded to the blade tip and the milling operation is performed, whereby deep cuts R (see FIG. 5) are readily produced due to overcutting. However, in the present embodiment, a configuration is adopted in which built up edge is not readily formed; specifically, the rake angle (rake angle in the axis direction) β of the primary bottom blade 5 having the convex edge 7 as shown in FIG. 6 is set equal to or greater than 5° and equal to or less than 30°, whereby these problems are overcome. Specifically, a rake angle β of less than 5° worsens milling properties and causes built up edge to more readily form; conversely, a rake angle β exceeding 30° makes the blade angle too small, worsens durability against cutting resistance, and causes defects to more readily occur. Reference symbol Q in FIG. 5 indicates a normally produced circular cutting mark produced by a portion (tip corner part in a conventional tool) for accomplishing the milling operation during planar milling.

The present embodiment is configured such that three of each of the blade parts comprising the secondary bottom blade 6 receding toward the tool base and the blade parts comprising the primary bottom blade 5 having the convex edge 7 are provided in an alternating manner; however, the number of blade parts comprising the primary bottom blade 5 having the convex edge 7 and other such blade parts can be set as appropriate. For example, two of each of the blade parts comprising the secondary bottom blade 6 receding toward the tool base and the blade parts comprising the primary bottom blade 5 having the convex edge 7 may be provided in an alternating manner at equally spaced intervals, as in alternative example 1 depicted in FIG. 7, or two of only the blade parts comprising the primary bottom blade 5 having the convex edge 7 may be provided, as in alternative example 2 depicted in FIG. 8. Furthermore, the number of blade parts comprising the secondary bottom blade 6 receding toward the tool base and the number of blade parts comprising the primary bottom blade 5 having the convex edge 7 may be set at different numbers (although such an arrangement not shown in the drawings). Specifically, one blade part comprising the secondary bottom blade 6 receding toward the tool base and two blade parts comprising the primary bottom blade 5 having the convex edge 7 may be provided, each of the blade parts being provided at equally spaced intervals.

In the present embodiment, the primary bottom blades 5 and the secondary bottom blades 6 are configured to be provided at equally spaced intervals; however, these bottom blades 5, 6 may be configured to be provided at unequally spaced intervals. Providing each of the bottom blades at unequally spaced intervals makes it possible to provide the outer peripheral blades 10, 11 connected to each of the bottom blades at unequally spaced intervals, and accordingly, to minimize chatter and obtain smoother and glossier high-quality planar milled surfaces and side-surface milled surfaces.

Figure 9:
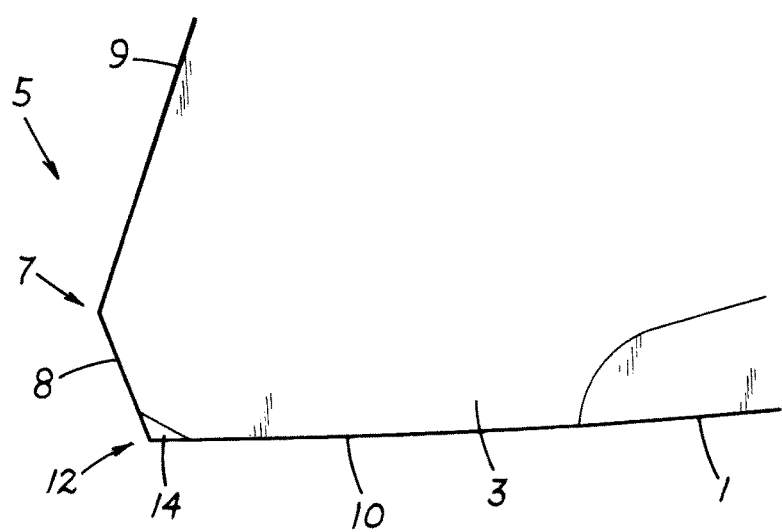
FIG. 9 is a schematic view of alternative example 3.

A minute surface (flat land 14) may be provided to the tip corner part 12 in order to minimize damage to the tool, as in alternative example 3 depicted in FIG. 9.

Because the present embodiment is configured as described above, a convex edge 7 is present on a primary bottom blade 5, whereby the convex edge 7 portion is the main portion that accomplishes a milling operation during planar milling (the main portion that comes in contact with the milled surface), and even if a tip corner part is damaged, gouges and the like that would be caused by contact with the damaged tip corner part are not readily produced in the milled surface.

Therefore, gouges and the like by a damaged tip corner part are not readily produced in the milled surface, and even when gouges and the like are produced, these gouges can be removed by the convex edge 7, enabling a high-quality planar milled surface to be easily obtained. Additionally, it is possible to overcome the effects of a damaged tip corner part, consequently enabling the service life of the tool to be extended.

Furthermore, the convex edge 7 can be formed by the connection of linear edges, enabling a tool to be easily manufactured while variations in form are minimized in tool production, without implementing the formation of an "R"-shaped part on the tip corner part of the tool or another such complicated milling step as with, e.g., a radius end mill.

Furthermore, setting the rake surface 3 of the primary bottom blade 5 having the convex edge 7 makes it possible to adopt a configuration in which it is possible to minimize the formation of built up edge as much as possible, enabling gouges and the like in a milled surface due to built up edge to be minimized.

Accordingly, the present embodiment makes it possible to finish a milled surface to produce a smooth and glossy surface.

The invention claimed is:

1. A rotary milling tool, the rotary milling tool comprising:
   a tool body,
   a plurality of chip discharge grooves provided to the outer periphery of a tip part of the tool body, the plurality of chip discharge grooves extending from the tip part of the tool body toward a base of the tool body, and
   a plurality of bottom blades provided to an intersection ridge part, the intersection ridge part provided at an intersection of a rake surface of the plurality of chip discharge grooves and a tip flank surface of the tool body, each of the plurality of bottom blades being formed integrally with the tool body,
   wherein a convex edge that is convex toward a tool-axis-direction tip is formed on at least one of the plurality of bottom blades, and the convex edge is formed by a connection of a plurality of substantially linear edges,
   wherein linear edges of the connection of the plurality of linear edges forming the convex edge comprises a first linear edge and a second linear edge,
   wherein the first linear edge is gradually inclined upward toward the tip part of the tool body, the first linear edge extending from the outer periphery of the tip part of the tool body toward a center of the tool, and
   wherein the second linear edge is gradually inclined downward toward the base part of the tool body, the second linear edge extending from the outer periphery of the tool body toward the center of the tool.

2. A rotary milling tool, the rotary milling tool comprising:
   a tool body,
   a plurality of chip discharge grooves provided to the outer periphery of a tip part of the tool body, the plurality of chip discharge grooves extending from the tip part of the tool body toward a base of the tool body, and
   a plurality of bottom blades provided to an intersection ridge part, the intersection ridge part provided at an intersection of a rake surface of the plurality of chip discharge grooves and a tip flank surface of the tool body, each of the plurality of bottom blades being formed integrally with the tool body,
   wherein a convex edge that is convex toward a tool-axis-direction tip is formed on at least one of the plurality of bottom blades, and the convex edge is formed by a connection of a plurality of substantially linear edges,
   wherein a concavity angle of the at least one of the plurality of bottom blades having the convex edge is equal to or greater than $-5°$ and less than $0°$, the length of a concave part of the at least one of the plurality of bottom blades having the convex edge is equal to or greater than 0.002 mm and equal to or less than one-fourth the outer diameter of the tool body, and a rake angle of the at least one of the plurality of bottom blades having the convex edge is equal to or greater than $5°$ and equal to or less than $30°$.

3. The rotary milling tool according to claim 1, wherein a concavity angle of the at least one of the plurality of bottom blades having the convex edge is equal to or greater than $-5°$ and less than $0°$, the length of a concave part of the at least one of the plurality of bottom blades having the convex edge is equal to or greater than 0.002 mm and equal to or less than one-fourth the outer diameter of the tool body, and a rake angle of the at least one of the plurality of bottom blades having the convex edge is equal to or greater than $5°$ and equal to or less than $30°$.

4. The rotary milling tool according to claim 2, wherein a rake surface of the at least one of the plurality of bottom blades having the convex edge is formed to be substantially planar, and the concave part has a centrally raised configuration.

5. The rotary milling tool according to claim 3, wherein the rake surface of the at least one of the plurality of bottom blades having the convex edge is formed to be substantially planar, and the concave part has a centrally raised configuration.

6. The rotary milling tool according to claim 4, wherein at least two of the plurality of bottom blades have the convex edge.

7. The rotary milling tool according to claim 5, wherein at least two of the plurality of bottom blades have the convex edge.

8. The rotary milling tool according to claim 6, wherein a plurality of blade parts in which outer peripheral blades thereof are connected to at least one of the plurality of bottom blades, at least one of the plurality of bottom blades being a primary bottom blade acting when planar milling is performed, and another at least one of the plurality of bottom blades being a secondary bottom blade provided so as to recede toward the tool base with respect to the primary bottom blade.

9. The rotary milling tool according to claim 7, wherein a plurality of blade parts in which outer peripheral blades thereof are connected to at least one of the plurality of bottom blades, at least one of the plurality of bottom blades being a primary bottom blade acting when planar milling is performed, and another at least one of the plurality of bottom blades being a secondary bottom blade provided so as to recede toward the tool base with respect to the primary bottom blade.

10. The rotary milling tool according to claim 8, wherein an outer peripheral rake angle of an outer peripheral blade connected to a secondary bottom blade is equal to or greater than $5°$ and equal to or less than $30°$.

11. The rotary milling tool according to claim 9, wherein an outer peripheral rake angle of an outer peripheral blade connected to a secondary bottom blade is equal to or greater than $5°$ and equal to or less than $30°$.

12. The rotary milling tool according to claim 10, wherein the plurality of blade parts is provided with a same number of blade parts of the plurality of blade parts connected to a secondary bottom blade and blade parts of the plurality of blade parts connected to a primary bottom blade, and
   wherein the plurality of blade parts are provided in an alternating manner.

13. The rotary milling tool according to claim 11, wherein the plurality of blade parts is provided with a same number of blade parts of the plurality of blade parts connected to a secondary bottom blade are provided and blade parts of the plurality of blade parts connected to a primary bottom blade, and
   wherein the plurality of blade parts are provided in an alternating manner.

14. The rotary milling tool according to claim 12, wherein in a region in which an outer peripheral blade of a blade part of the plurality of blade parts connected to a secondary bottom blade performs a milling operation, and an outer peripheral blade of a blade part of the plurality of blade parts connected to a primary bottom blade is set back inward in a radial direction of the tool with respect to the outer peripheral blade connected to the secondary bottom blade.

15. The rotary milling tool according to claim 13, wherein in a region in which the outer peripheral blade of a blade part of the plurality of blade parts connected to a secondary bottom blade performs a milling operation, and an outer peripheral blade of a blade part of the plurality of blade parts connected to a primary bottom blade is set back inward in a radial direction of the tool with respect to the outer peripheral blade connected to the secondary bottom blade.

16. The rotary milling tool according to claim 14, wherein at least one of the chip discharge grooves among the plurality of chip discharge grooves is formed in a helical shape around a tool central axis.

17. The rotary milling tool according to claim 15, wherein at least one of the chip discharge grooves among the plurality of chip discharge grooves is formed in a helical shape around a tool central axis.

18. The rotary milling tool according to claim 16, wherein the rotary milling tool is a square end mill.

19. The rotary milling tool according to claim 17, wherein the rotary milling tool is a square end mill.

* * * * *